United States Patent
Shouji et al.

(10) Patent No.: US 10,844,456 B2
(45) Date of Patent: Nov. 24, 2020

(54) COLD WORK TOOL AND METHOD FOR MANUFACTURING SAME

(71) Applicant: HITACHI METALS, LTD., Tokyo (JP)

(72) Inventors: Tatsuya Shouji, Yasugi (JP); Yukio Shinji, Yasugi (JP); Katsufumi Kuroda, Yasugi (JP)

(73) Assignee: HITACHI METALS, LTD., Tokyo (JP)

( * ) Notice: Subject to any disclaimer, the term of this patent is extended or adjusted under 35 U.S.C. 154(b) by 188 days.

(21) Appl. No.: 15/523,780

(22) PCT Filed: Mar. 1, 2016

(86) PCT No.: PCT/JP2016/056234
§ 371 (c)(1),
(2) Date: May 2, 2017

(87) PCT Pub. No.: WO2016/152406
PCT Pub. Date: Sep. 29, 2016

(65) Prior Publication Data
US 2017/0327920 A1 Nov. 16, 2017

(30) Foreign Application Priority Data

Mar. 26, 2015 (JP) ................................. 2015-064366

(51) Int. Cl.
*C21D 9/46* (2006.01)
*B21D 37/01* (2006.01)
(Continued)

(52) U.S. Cl.
CPC .............. *C21D 9/46* (2013.01); *B21D 37/01* (2013.01); *B21D 37/20* (2013.01); *B21J 13/02* (2013.01);
(Continued)

(58) Field of Classification Search
CPC ......... C22C 38/02; C22C 38/04; C22C 38/00; C22C 38/002; C22C 38/22; C22C 38/24;
(Continued)

(56) References Cited

U.S. PATENT DOCUMENTS

| | | | |
|---|---|---|---|
| 2009/0107587 A1* | 4/2009 | Shimizu | C21D 6/002 148/335 |
| 2009/0123322 A1* | 5/2009 | Barbosa | C21D 8/005 420/37 |

FOREIGN PATENT DOCUMENTS

| | | | |
|---|---|---|---|
| CN | 2013160755 | * | 6/2013 |
| EP | 2055798 A1 | | 5/2009 |

(Continued)

OTHER PUBLICATIONS

English language machine translation of JP 2000-045020 to Tate et al. Generated May 25, 2020. (Year: 2020).*

(Continued)

*Primary Examiner* — Brian D Walck
(74) *Attorney, Agent, or Firm* — Sughrue Mion, PLLC (57) ABSTRACT

Provided are: a cold work tool having excellent wear resistance; and a method for manufacturing the cold work tool. A cold work tool which has an ingredient composition that can be prepared into a martensite structure by quenching and which has a martensite structure, wherein the hardness of the cold work tool is 58 HRC or more, the area ratio of a carbide having an equivalent circle diameter of 5 μm or more in the cross-sectional structure of the cold work tool is 4.0% by area or more, and the carbon solid solution fraction, which is expressed by the ratio of the mass ratio of the amount of carbon that is present in the form of a solid solution in the structure of the cold work tool to the mass ratio of the amount of carbon that is contained in the whole of the cold work tool, is 75.0% or more. A method for manufacturing a (Continued)

cold work tool, which is suitable for manufacturing the aforementioned cold work tool.

4 Claims, 3 Drawing Sheets

(51) Int. Cl.
| | |
|---|---|
| B21D 37/20 | (2006.01) |
| B21J 13/02 | (2006.01) |
| B23B 27/14 | (2006.01) |
| C21D 1/18 | (2006.01) |
| C21D 1/25 | (2006.01) |
| C22C 38/02 | (2006.01) |
| C22C 38/04 | (2006.01) |
| C22C 38/22 | (2006.01) |
| C22C 38/24 | (2006.01) |
| C22C 38/26 | (2006.01) |
| C22C 38/36 | (2006.01) |
| C22C 38/40 | (2006.01) |
| C21D 8/02 | (2006.01) |
| C22C 38/00 | (2006.01) |
| C21D 6/00 | (2006.01) |
| C21D 9/00 | (2006.01) |

(52) U.S. Cl.
CPC .............. *B23B 27/14* (2013.01); *C21D 1/18* (2013.01); *C21D 1/25* (2013.01); *C21D 6/002* (2013.01); *C21D 6/005* (2013.01); *C21D 6/008* (2013.01); *C21D 8/0205* (2013.01); *C21D 8/0236* (2013.01); *C21D 8/0247* (2013.01); *C22C 38/00* (2013.01); *C22C 38/002* (2013.01); *C22C 38/02* (2013.01); *C22C 38/04* (2013.01); *C22C 38/22* (2013.01); *C22C 38/24* (2013.01); *C22C 38/26* (2013.01); *C22C 38/36* (2013.01); *C22C 38/40* (2013.01); *C21D 9/0068* (2013.01); *C21D 2211/004* (2013.01); *C21D 2211/008* (2013.01)

(58) Field of Classification Search
CPC ......... C22C 38/26; C22C 38/36; C22C 38/40; C21D 9/46; C21D 1/18; C21D 1/25; C21D 6/002; C21D 6/005; C21D 6/008; C21D 6/0205; C21D 6/0236; C21D 6/0247; B21D 37/01; B21D 37/20; B21J 13/02; B23B 27/14
USPC .................................. 148/320, 324, 325, 542
See application file for complete search history.

(56) References Cited

FOREIGN PATENT DOCUMENTS

| | | | |
|---|---|---|---|
| EP | 2 979 772 A1 | | 2/2016 |
| EP | 3199656 A1 | | 8/2017 |
| JP | 05-156407 A | | 6/1993 |
| JP | 2000-045020 | * | 2/2000 |
| JP | 2000-073142 A | | 3/2000 |
| JP | 2005-325407 A | | 11/2005 |
| JP | 2006-336049 A | | 12/2006 |
| JP | 2014-145100 A | | 8/2014 |
| WO | 2014/156487 A1 | | 10/2014 |

OTHER PUBLICATIONS

English language machine translation of CN 2013160755 to Ping. Generated May 25, 2020. (Year: 2020).*

Communication dated Oct. 17, 2017 issued by the European Patent Office in counterpart application No. 16768309.3.

International Search Report of PCT/JP2016/056234 dated Jun. 7, 2016 [PCT/ISA/210].

* cited by examiner

COLD WORK TOOL AND METHOD FOR MANUFACTURING SAME

TECHNICAL FIELD

The present invention relates to various kinds of cold work tools such as a press die, forging die, rolling die or a cutting tool for metal cutting and to a method for manufacturing the tool.

BACKGROUND ART

Since a cold work tool is used in contact with a hard workpiece, the tool is required to have a sufficient wear resistance to resist the contact. Conventionally, alloy tool steels, such as SKD10 or SKD11 series, which are standardized steel types of JIS-G-4404, have been used for a cold work tool material (Non-patent Literature 1).

Typically, a cold work tool material is manufactured from a raw material, as a starting material, such as an ingot or a bloom which is produced from the ingot. The starting material is subjected to various hot workings and heat treatments to produce a predetermined steel material, and then the steel material is annealed to produce a final cold work tool material having e.g. a block shape. The cold work tool material in the annealed state having a low hardness is typically supplied to a manufacturer of a cold work tool. The material supplied to the manufacturer is machined into a shape of the cold work tool, and is thereafter quenched and tempered to adjust its hardness for use. After the adjustment of the hardness, finishing machining is typically conducted. In some cases, the cold work tool material in the annealed state is quenched and tempered first, and is then machined into a shape of the tool together with finish machining.

The term "quenching" refers to an operation for heating a cold work tool material in an annealed state (or a cold work tool material after machined) at an austenitic phase temperature range and then rapidly cooling it to transform a structure thereof into a martensitic structure. Thus, the material has such a composition that can have a martensitic structure by quenching. Thus, the quenched and tempered cold work tool has a martensitic structure. In some cases, the structure of the tool may include a bainitic structure, retained austenitic structure, or the like other than the martensitic structure.

Also, it has been known that a wear resistance of the cold work tool can be improved by increasing a hardness of a matrix of a quenched and tempered structure, and by providing non-soluted carbides in the matrix. The "matrix" refers to a portion of the structure of the cold work tool excluding the carbides therefrom. The "non-soluted carbide" refers to a large carbide that is not solid-soluted in the matrix through the quenching. In this connection, proposed is a cold work tool including non-soluted carbides having a grain size up to 20 µm distributed uniformly in a quenched and tempered structure (Patent Literature 1). Also, methods for increasing a hardness of a cold work tool are proposed, such as by adjusting an amount of retained austenite in a quenched and tempered structure (Patent Literature 2), or by adjusting amounts of Cr and Mo solid-soluted into a matrix (Patent Literatures 3 and 4).

CITATION LIST

Patent Literature

Patent Literature 1: JP-A-05-156407
Patent Literature 2: JP-A-2000-73142
Patent Literature 3: JP-A-2005-325407
Patent Literature 4: JP-A-2014-145100

Non-Patent Literature

Non-patent Literature 1: "JIS-G-4404 (2006) Alloy Tool Steels", JIS Handbook (1) Ferrous Materials and Metallurgy I, General Incorporated Foundation of The Japanese Standards Association, Jan. 23, 2013, pages 1652-1663

SUMMARY OF INVENTION

The cold work tools of Patent Literatures 1 to 4 have good wear resistance. However, such cold work tools can not have expected wear resistance in some cases, although they have sufficient hardness and a sufficient amount of non-soluted carbides are included in a quenched and tempered structure.

An object of the present invention is to provide a cold work tool excellent in wear resistance and a method for manufacturing the tool.

The present invention provides a cold work tool having a composition adjustable to have a martensitic structure by quenching, and including the martensitic structure. The tool has a hardness of not lower than 58 HRC. An area ratio of carbides having a circle equivalent diameter of not less than 5 µm in the cross-sectional structure of the cold work tool is not lower than 4.0 area %. When a carbon solid solution ratio is defined by a ratio, by mass, between an amount of solid-soluted carbon in an structure of the tool to an total amount carbon included in the tool, the carbon solid solution ratio is not less than 75.0%.

It is preferable that the carbon solid solution ratio is not less than 80.0%.

The present invention also provides a method for manufacturing a cold work tool, including:

a casting step of pouring a molten steel into a mold wherein the steel has a composition adjustable to have a martensitic structure by quenching and the molten steel has a temperature of 90° C. to 110° C. above a melting point, and cooling the poured steel at cooling rate such that the steel passes a solid-liquid phase coexistence region within 60 minutes to produce a raw material, a hot working step of subjecting the raw material to hot working, and cooling the hot-worked raw material to a temperature generating a martensitic transformation to produce a steel including martensite transformed from a structure of the raw material, an annealing step of subjecting the steel to annealing to produce a cold work tool material, and a quenching and tempering step of subjecting the cold work tool material to quenching and tempering to produce a cold work tool having a martensitic structure and having a hardness of not lower than 58 HRC.

According to the present invention, the wear resistance of the cold work tool can be improved.

DESCRIPTION OF EMBODIMENTS

The present inventors investigated factors affecting a wear resistance of a cold work tool. As a result, it has known that the wear resistance of the cold work tool was largely affected by an amount of carbon solid-soluted in a quenched and tempered structure. It has been also found that the cold work tool having excellent wear resistance among the tools having a same composition is a tool that has an adjusted hardness and an adjusted distribution of non-soluted carbides in the structure, as well as an adjusted amount of carbon solid-soluted in the structure. Each component required in the present invention will be described below.

(1) The cold work tool of the present invention has a composition adjustable to have a martensitic structure by quenching, and has the martensitic structure.

Typically, the cold work tool is manufactured by quenching and tempering a cold work tool material having an annealed structure. The "annealed structure" refers to a structure obtained by an annealing, and is softened to have a Brinnel hardness of e.g. about 150 HBW to about 230 HBW. Typically, the annealed structure has a ferrite phase, or a ferrite phase with pearlite or cementite ($Fe_3C$). Furthermore, the annealed structure of the cold work tool material typically includes carbides composed of carbon bonded with Cr, Mo, W, V or the like.

As described above, a raw material generating a martensitic structure by quenching and tempering has been conventionally used for such cold work tool material. The martensitic structure is a necessary for absolute mechanical properties of various cold work tools. The quenched and tempered cold work tool has the martensitic structure. As described above, the structure of the cold work tool may include a bainitic structure, a retained austenitic structure or the like other than the martensitic structure.

Various cold work tool steels, for example, have been used for the cold work tool (or the cold work tool material). The cold work tool steel is used in an environment where a surface temperature is not higher than about 200° C. A composition of such cold work tool steels can employ those of standardized steel types specified in "alloy tool steel" of JIS-G-4404 for example or other proposed compositions. Other elements other than those specified in the above cold work tool steel can be added and included according to a necessity. The "effect of improving wear resistance" of the present invention can be achieved by the hardness of the cold work tool manufactured from the raw material and the quenched and tempered structure satisfies requirements (2) to (4) described below as far as the annealed structure of the raw material can be transformed in a martensitic structure through quenching and tempering.

It is preferable, in order to obtain the "effect for improving wear resistance" of the present invention at a high level, to specify contents of carbon and carbide forming elements such as Cr, Mo, W or V, which contribute to a hardness of the tool, and amounts of carbides and solid-soluted carbon in the structure, among the composition generating the martensite structure. Specifically, the composition includes, by mass %, C: 1.30 to 2.40%, Cr: 8.0 to 15.0%, Mo and W alone or in combination in an amount of (Mo+½W): 0.50 to 3.00%, and V: 0.10 to 1.50%. The cold work tool of the present invention may have a steel composition including the above element. Furthermore, the composition may include the above elements and the balance being Fe and impurities. The elements forming the preferable composition of the cold work tool material of the present invention are as follows.

C: 1.30 to 2.40 Mass % ("Mass %" is Hereinafter Expressed Merely as "%")

Carbon is a basic element of the cold work tool material. Carbon partially solid-solutes in a matrix to make the matrix hard and partially forms carbides to improve a wear resistance and a seizure resistance. When substitutional atoms, such as Cr, with high affinity with carbon is added together with carbon solid-soluting as interstitial atoms, an I (interstitial atoms)-S(substitutional atoms) effect is also expected (which acts as the drag resistance of solid-soluted atoms and enhances a strength of the cold work tool). However, if excessive carbon is added, an amount of non-soluted carbons increases excessively, which leads to deterioration of a toughness. Therefore, a carbon content is made 1.30 to 2.40%, preferably not less than 1.40%, or preferably not more than 1.80%.

Cr: 8.0 to 15.0%

Cr is an element that increases hardenability. Furthermore, Cr forms carbides to effect in improving a wear resistance. Cr is a basic element of the cold work tool material contributing also to improvement of a resistance to softening in tempering. However, excessive addition will cause formation of coarse non-soluted carbides and lead to deterioration in toughness. Therefore, a Cr content is made 8.0 to 15.0%, preferably not more than 14.0% or preferably not less than 9.0%, more preferably not less than 11.0%.

Mo and W Alone or in Combination in an Amount of (Mo+½W): 0.50 to 3.00%

Mo and W are elements causing fine carbides to precipitate or aggregate in a structure through tempering, and thereby imparting a strength to the cold work tool. Mo and W may be added alone or in combination. The amount can be specified by a Mo equivalent that is defined by a formula of (Mo+½W) since an atomic weight of W is about twice of that of Mo. Of course, only one of them may be added or both may be added. To achieve the above effects, an amount of (Mo+½W) is made not less than 0.50%, preferably not less than 0.60%. Since excessive addition will cause deterioration of machinability and toughness, the amount of (Mo+½W) is not more than 3.00%, preferably not more than 2.00%, more preferably not more than 1.50%.

V: 0.10 to 1.50%

Vanadium forms carbides and has effects of strengthening a matrix and improving a wear resistance and a resistance to softening in tempering. Also, vanadium carbides distributed in an annealed structure function as "pinning particles" that suppress coarsening of austenite grains during heating for quenching, and thereby also contribute to improvement of toughness. To achieve the effects, a vanadium content is made not less than 0.10%, preferably not less than 0.20%. Also, vanadium is an element effective in forming solid-soluted carbides in an annealed structure. The solid-soluted carbides are small carbides solid-soluted to a matrix in quenching. In the present invention, an amount of carbon solid-soluted in the structure of the tool can be increased since the solid-soluted carbides are soluted into the matrix. Therefore, not less than 0.60% of vanadium may be also added in the tool for the purpose. However, when vanadium is added excessively, a machinability is deteriorated and also a toughness is decreased due to increase of carbides. Therefore, the vanadium content is made not more than 1.50%, preferably not more than 1.00%.

The composition of the cold work tool of the present invention may include following elements in addition to the above elements.

Si: Not More than 2.00%

Si is used as a deoxidizer in a melting process. Excessive amount of Si deteriorates hardenability, as well as toughness of the quenched and tempered tool. Thus, the Si content is preferably not more than 2.00%, more preferably not more than 1.50%, further more preferably not more than 0.80%. On the other hand, Si solid-solutes in the structure of the tool and has an effect of enhancing hardness of the tool. To obtain the effect, a Si content is preferably not less than 0.10%.

Mn: Not More than 1.50%

Excessive amount of Mn increases ductility of a matrix, and thereby deteriorates machinability of the material. Thus, an amount of Mn is preferably not more than 1.50%, more preferably not more than 1.00%, further more preferably not more than 0.70%. On the other hand, Mn is an austenite forming element, and it has an effect of enhancing hardenability. Moreover, Mn has a large effect of improving machinability since it forms non-metallic inclusions of MnS. To achieve the effects, an amount of Mn is preferably not less than 0.10%, more preferably not less than 0.20%.

P: Not More than 0.050%

Phosphor is an element inevitably included in various cold work tools even though it is not added. Phosphor segregates in prior austenite grain boundaries during a heat treatment such as tempering, thereby making the grain boundaries brittle. Therefore, it is preferable to limit a phosphor content, including a case of intentionally adding, to not more than 0.050% in order to improve toughness of the tool. More preferably, it is not more than 0.030%.

S: Not More than 0.0500%

Sulfur is an element inevitably included in various cold work tools even though it is not added. Sulfur deteriorates hot workability of a raw material before hot-worked, and producing cracks during the hot working. Therefore, it is preferable to limit a sulfur content to not more than 0.0500%, more preferably not more than 0.0300% in order to improve hot workability. On the other hand, sulfur has an effect of improving machinability by bonding with Mn to form non-metallic inclusions of MnS. An amount exceeding 0.0300% may be added to achieve the effect.

Ni: 0 to 1.00%

Ni deteriorates a machinability since it increases a ductility of a matrix. Thus, a Ni content is preferably not more than 1.00%, more preferably not more than 0.50%, further more preferably not more than 0.30%.

On the other hand, Ni is an element suppressing generation of a ferrite phase in a tool structure. Moreover, Ni is effective in imparting excellent hardenability to the cold work tool material, and thus enabling formation of a structure mainly composed of martensite phase to prevent deterioration of toughness even when a cooling rate in quenching is slow. Furthermore, since Ni also improves intrinsic toughness of a matrix, it may be added according to necessity in the present invention. In a case of adding Ni, not less than 0.10% is preferably added.

Nb: 0 to 1.50%

Since Nb causes deterioration of a machinability, a Nb content is preferably not more than 1.50%. On the other hand, Nb has an effect of forming carbides to strengthen a matrix and improve a wear resistance. Moreover, Nb increases a resistance to softening in tempering. Nb also has an effect of suppressing coarsening of grains and thereby contributing to improvement of a toughness similarly to vanadium. Thus, Nb may be added according to a necessity. In a case of adding Nb, not less than 0.10% is preferably added.

Cu, Al, Ca, Mg, O (oxygen) and N (nitrogen) in the composition of the cold work tool of the present invention may possibly remain in the steel as inevitable impurities for example. In the present invention, it is preferable to limit amounts of the elements as low as possible. On the other hand, a small amount of the elements may be added to obtain additional functions or effects, such as control of a form of inclusions, or improvement of other mechanical properties or productivity. In the case, following ranges are permissible: Cu≤0.25%; Al≤0.25%; Ca≤0.0100%; Mg≤0.0100%; O≤0.0100%; and N≤0.0500%. These are preferable upper limits of the elements according to the present invention. With respect to nitrogen, more preferable upper limit is 0.0300%.

(2) The cold work tool has a hardness of not lower than 58 HRC.

The hardness of the tool is a basic requirement for absolute wear resistance of the tool. Thus, the hardness of the tool according to the present invention is made not less than 58 HRC, preferably not less than 60 HRC. While an upper limit of the hardness is not particularly limited, about 66 HRC is realistic, and about 63 HRC is more realistic.

The hardness of the tool is determined totally by various factors in the structure. The factors include, for example, a distribution of carbides and inclusions in the structure, amount of solid-soluted elements in a matrix, and a degree of compositional segregation. Therefore, even if tools have a same composition and same hardness, the tools may have different wear resistance when the above factors differ. In the present invention, it was found that the component (3) "an area ratio of carbides having a circle equivalent diameter of not less than 5 μm in a cross-sectional structure of the tool is not lower than 4.0 area %" and the component (4) "the carbon solid solution ratio defined as a ratio, by mass, of an amount of carbon solid-soluted in the structure of the tool to a total amount of carbon included in the tool", among the various factors, are to be optimally controlled in order to make the tool having the hardness of not lower than 58 HRC have a high wear resistance.

(3) In the cold work tool of the present invention, an area ratio of carbides having a circle equivalent diameter of not less than 5 μm in a cross-sectional structure of the tool is not lower than 4.0 area %.

Typically, the annealed structure of the cold work tool material includes carbides composed of Cr, Mo, W, V or the like bonded with carbon. The carbides include large "non-soluted carbides" and small "solid-soluted carbides". The non-soluted carbides" are not solid-soluted in the matrix through the subsequent quenching and the small "solid-soluted carbides" are solid-soluted in the matrix in the quenching. The non-soluted carbides remain in the quenched and tempered structure and contribute to improvement of the wear resistance of the tool.

In particular, the carbides having a circle equivalent diameter of "not less than 5 µm" in the quenched and tempered cross-sectional structure largely contribute to the improvement of the wear resistance in the tool of the present invention. Furthermore, when the area ratio of the carbides having a circle equivalent diameter of not less than 5 µm in the cross-sectional structure is made not lower than 4.0 area %, the wear resistance of the tool having the hardness of not lower than 58 HRC can be further enhanced. The area ratio is preferably not lower than 5.0 area %, more preferably not lower than 6.0 area %, still more preferably not lower than 7.0 area %.

However, when the area ratio is too large, the toughness of the tool deteriorates. Therefore, an upper limit of the area ratio is made preferably 20.0 area %, more preferably 15.0 area %.

Please note that the "cross-sectional structure" is not limited to a cross-sectional structure of a portion of martensite. If the cross-sectional structure includes other structures such as a bainitic structure and a retained austenitic structure other than the martensitic structure, the "cross-sectional structure" means a cross-sectional structure "as a whole" including these structures.

A method for measuring the circle equivalent diameter and the area ratio of the carbides in the cross-sectional structure of the cold work tool will be described.

First, a cross-sectional structure of the tool is observed with an optical microscope with a magnification of e.g. 200 times. The cross section to be observed can be taken from a portion in a vicinity of a working surface of the tool (a die engraved surface in a case of a die). The cross-sectional surface having an area of e.g. 15 mm*15 mm is polished to a mirror surface with a diamond slurry. Preferably, the polished mirror surface is etched by any etching method before observation so that a boundary between the non-soluted carbides and the matrix becomes clear.

Next, the optical microscope photograph was subjected to image processing to conduct a binarizing with setting, as a threshold, a boundary of the carbide and the matrix (for example, a boundary between a colored part and an uncolored part by the etching). Thus, a binarized image showing the carbides distributed in the matrix of the cross-sectional structure was obtained. Such binarizing process can be conducted by known image analysis software or the like.

Further image processing was conducted to the binarized image to measure a circle equivalent diameter observed in the cross-sectional structure. Furthermore, the carbides having a circle equivalent diameter of not less than 5 µm are extracted to measure the area ratio of the carbides in the area of the observed field of view. As an area of the observed field of view, 877 µm*661 µm (=0.58 mm$^2$) per one field of view is sufficient to confirming the effect of the present invention, it is sufficient to conduct the observation for 10 fields of view in the cross sections having an area of 15 mm*15 mm, and to average the measured area ratios obtained in the fields.

(4) In the cold work tool of the present invention, a carbon solid solution ratio is not less than 75.0%, where the carbon solid solution ratio is defined as a ratio, by mass, of an amount of carbon solid-soluted in the structure of the tool to a total amount of carbon included in the tool.

The solid solution carbides solid-solute into the matrix through quenching, and increases an amount of carbon solid-soluted in the quenched and tempered structure. When a ratio of the amount of carbon solid-soluted in the structure to a total amount of carbon is great, such tool has high wear resistance among cold work tools having the same hardness after quenching and tempering. In other words, the non-soluted carbides having "a circle equivalent diameter of not less than 5 µm" are effective in improving the wear resistance of the tool. However, it is not easy to distribute such large carbides uniformly in the structure of the tool. The large carbides distribute typically in a streak in the cross-sectional structure of the tool (see FIG. 1).

Therefore, the matrix itself of the structure can be strengthened by increasing the ratio of the amount of solid-solutedcarbon according to the present invention. As a result, the wear resistance can be enhanced even in a region where comparatively less non-soluted carbides precipitate. In the cold work tool of the present invention, "carbon solid solution ratio" defined by a ratio, by mass, of an amount of carbon "solid-soluted in the structure" to an amount of total carbon of the tool is made not less than 75.0%, and thus, the wear resistance of the tool having the hardness of not lower than 58 HRC can be further enhanced. The carbon solid solution ratio is preferably not less than 80.0%, more preferably not less than 85.0%. However, when the carbon solid solution ratio is too high, an amount of carbon capable of forming carbides reduces, and the optimum balance between the "area ratio of carbides having a circle equivalent diameter of not less than 5 µm" and the "amount of carbon solid-soluted in the structure" is liable to be lost. In the case, the tool will hardly keep the hardness of "not lower than 58 HRC". Therefore, the carbon solid solution ratio is made preferably not more than 95.0%, more preferably not more than 93.0%, still more preferably not more than 90.0%.

Please note that the "structure of the cold work tool" into which carbon is solid-soluted is not limited to a structure of martensite. If the structure of the tool includes other structures also such as a bainitic structure or a retained austenitic structure other than the martensitic structure, the "structure of the cold work tool" means a structure "as a whole" including these structures.

A method for measuring the "amount of carbon solid-soluted in the structure" of the cold work tool will be described.

First, a sample is taken from a vicinity of a working surface of a cold work tool (a die engraved surface in the case of a die). If the working surface may be treated or coated or be oxidized, scaled or decarburized or the like, the sample is taken so as to exclude such affected portion. Then, the sample is powdered finely by machining, a grinding method or the like, and an analyzing sample of 0.5 g is taken out of the powder. Then, the analyzing sample is dissolved in a sulfo-phosphoric acid aqueous solution without heating, and the portion of only "matrix" in the total structure of the tool is dissolved.

Next, the aqueous solution in which the analyzing sample is dissolved is filtered with a glass filter having a pore diameter of 0.3 µm. Then, "residue" remaining on the glass filter is analyzed along with the glass filter with a combustion-infrared absorption method to measure the amount of carbon in the dissolution residue. The result is "the amount of carbon forming carbides" in the structure of the tool. Also, the amount of carbon in the residue in the analyzing sample of 0.5 g is calculated to obtain a mass ratio (by mass %), and the value is subtracted from a mass ratio (by mass %) of a total carbon content of the tool. Thus a mass ratio (by mass %) of the amount of carbon solid-soluted into the structure of the tool is obtained. In this connection, the amount of solid-soluted carbon possibly includes "an ultra-fine carbide" that has passed through the pore diameter of the glass filter. However, it has been confirmed that the value does not affect the effects of the present invention.

Also, the "carbon solid solution ratio" of the present invention can be obtained from the amount of carbon solid-soluted in the structure and the total carbon content of the tool, both of which are expressed by "mass %", by a formula:

(amount of solid-soluted carbon/total carbon content)*100(%).

It is effective to adjust the annealed structure of the cold working tool material before quenching and tempering, in order to obtain the structure of the tool of the present invention. That is, the annealed structure of the material is made include large non-soluted carbides, as well as many fine solid-soluted carbides. The fine carbides having a circle equivalent diameter of e.g. not more than 0.4 µm in the cross-sectional structure of the material are easily solid-soluted through quenching, and are effective in increasing the amount of carbon solid-soluted in the structure of the tool.

Such cold work tool material can be obtained by properly controlling solidifying progress of an ingot in producing the ingot as a starting material. It is important to control, for example, a "temperature of a molten steel" immediately before poured into a mold. Coarsening of carbides can be suppressed by lowering the temperature of the molten steel when poured into the mold, for example within a temperature range up to about 100° C. above a melting point of the material (for example, from 90° C. to 110° C. above the melting point). Furthermore, coarsening of precipitated carbides can be suppressed for example by cooling the molten steel poured into the mold so as to quickly pass the solid-liquid phase coexistence region, such as within 60 minutes.

The tool structure according to the present invention can be achieved by conducting "sufficient cooling" of the hot-worked steel, which hot working is a previous step of the annealing step and for shaping the steel in a plate in a process of producing the cold work tool material. The "sufficient cooling" means a step of cooling the hot-worked raw material (steel) sufficient to a temperature for generating a martensitic transformation to convert the structure to martensite, but not a step of moving the steel to the next annealing step while keeping the high temperature. The sufficient cooling makes carbide forming elements that has been solid-soluted in the structure during the hot working precipitate as fine carbides through the martensitic transformation. As a result, the "small solid solution carbides" can be further miniaturized in the annealed structure of the cold work tool material. The fine solid solution carbides very easily solid-solute through quenching, and an amount of carbon solid-soluted in the structure of the tool can be increased.

Theoretically, the sufficient cooling is conducted to a temperature not higher than a "martensitic transformation point". However, it may be a temperature at which the structure of the hot worked raw material transforms in the martensite. Realistically, the temperature is not higher than about 300° C., preferably not higher than 200° C. for the raw material having the composition described in the above (1), including e.g. SKD10 and SKD11 which are the standardized steel types pursuant to the JIS-G-4404.

The cold work tool of the present invention is manufactured by quenching and tempering the cold work tool material in an annealed state. While the temperature for the quenching and tempering varies according to a composition of the material, a target hardness, or the like, the quenching temperature is preferable about 950° C. to about 1,100° C. and the tempering temperature is preferable to be about 150° C. to about 600° C. For example, For SKD10 and SKD11 which are the standardized steel types of the JIS-G-4404, the quenching temperature is about 1,000° C. about 1,050° C., and the tempering temperature is about 180° C. to about 540° C. It is effective for saving an energy cost to lower the quenching temperature. In this regard, the upper limit of the quenching temperature is preferably 1,040° C., more preferably 1,030° C.

The cold work tool of the present invention is shaped by various machining or the like, such as cutting or boring. The machining is preferable conducted in a state where the material has a low hardness before quenched and tempered (that is, in an annealed state). In this case, finish machining may be further conducted after quenched and tempered. In some cases, a pre-hardened material after quenched and tempered may be machined to a finished shape of the tool together with finishing machining.

Example 1

Molten steel adjusted to have a predetermined composition (melting point is about 1,400° C.) was cast to produce raw materials 1 and 2 of Table 1. The raw materials 1 and 2 are of the cold work tool steel SKD10 which is a standardized steel type of JIS-G-4404. Cu, Al, Ca, Mg, O, and N were not added to the raw materials 1 and 2 (in some cases, Al was added as a deoxidizer in the melting step), and satisfy Cu≤0.25%, Al≤0.25%, Ca≤0.0100%, Mg≤0.0100%, O≤0.0100%, and N≤0.0500%. Before poured into a mold, the molten steel was controlled to have a temperature of 1,500° C. The poured molten steel in the mold was cooled and pass a solid phase-liquid phase coexistence region for 45 minutes for the material 1, and for 168 minutes for the 2 by changing a size of respective mold for the materials 1 and 2.

TABLE 1

| Raw material | C | Si | Mn | P | S | Cr | Mo | V | Fe$^\times$ |
|---|---|---|---|---|---|---|---|---|---|
| | | | | | | | | | mass % |
| 1 | 1.48 | 0.53 | 0.42 | 0.022 | 0.0002 | 11.9 | 0.76 | 0.74 | Bal. |
| 2 | 1.48 | 0.42 | 0.32 | 0.025 | 0.0008 | 11.4 | 0.87 | 0.69 | Bal. |

$^\times$including impurities

Next, these raw materials were heated at 1,160° C. and hot-worked. After the hot working, they were natural-cooled and thus steels having a thickness of 25 mm, a width of 500 mm and a length of 1,000 mm were produced. In the cooling after the hot working, the material 1 was subjected to sufficient cooling until 170° C. The material 2 was heated for the subsequent annealing step before cooled to 300° C. The steel materials were subjected to annealing at 860° C., and cold work tool materials 1 and 2 were produced (having a hardness of about 190 HBW). Furthermore, these cold work tool materials 1 and 2 were quenched and tempered, and cold work tools 1 and 2 having a martensitic structure were produced. The quenching temperature was 1,030° C., and the tempering temperature was selected from a range of 480 to 540° C. so as to have a hardness 60 HRC.

First, a ratio of carbides having a circle equivalent diameter of not less than 5 µm in the cross-sectional structure of the cold work tools 1 and 2 was measured. Assuming that a working surface of an actual tool is positioned inside of the steel material, a cross-sectional surface, as a measuring surface, was taken at a position ¼ width inward from a surface in a width direction and ½ thickness inward from a surface in a thickness direction. This cross-sectional surface was a TD (transverse direction) surface which is parallel to a longitudinal direction of the material, that is, the direction extended by the hot working (extended direction of carbides).

Figure 1:
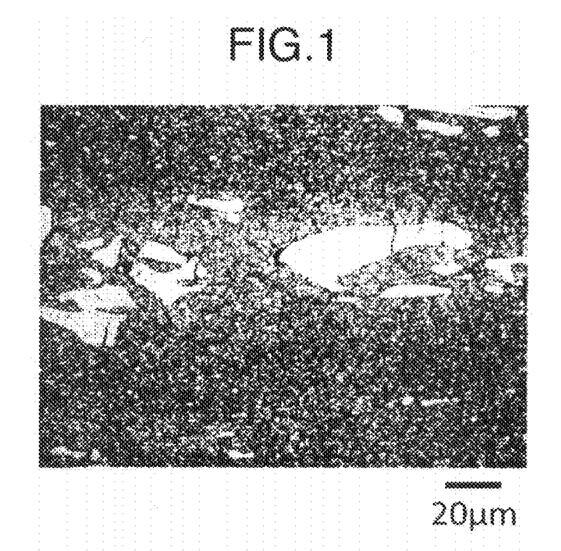
FIG. 1 is an optical microscope photograph of a cross-sectional structure of a cold work tool of an example according to the present invention for showing an example of carbide distribution in the cross-sectional structure.
Figure 2:
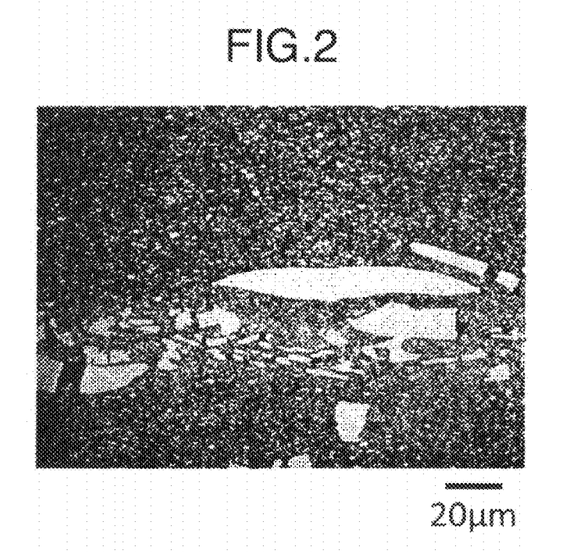
FIG. 2 is an optical microscope photograph of a cross-sectional structure of a cold work tool of a comparative example for showing an example of carbide distribution in the cross-sectional structure.

A cross-sectional surface having an area of 15 mm*15 mm was taken from the above cross-sectional surface, and was polished to a mirror surface with a diamond slurry. Next, the polished surface having the annealed structure was etched by electrolytic polishing so that a boundary of carbides and a matrix became clear. The etched surface was observed by an optical microscope with the magnification of 200 times. FIGS. 1 and 2 show examples of quenched and tempered micro-structure of the cold work tools 1 and 2 respectively (carbides are shown by light-colored distribution). Ten fields of view were photographed with one field of view having a region of 877 µm*661 µm (0.58 mm$^2$).

The optical microscope photograph was subjected to image processing to conduct a binarizing with setting, as a threshold, a boundary between a colored part and an uncolored part by the etching which corresponds to a boundary of the carbide and the matrix. Thus, a binarized image showing the carbides distributed in the matrix of the cross-sectional structure was obtained. Further image processing was conducted and the carbides having a circle equivalent diameter of not less than 5 µm were extracted. Thus, an area ratio of the carbides was obtained from an average of 10 fields of view. The result is shown in Table 2. A series of these image processing and analysis were conducted with use of an open source image processing software "ImageJ" (http://image-J.nih.gov/ij/) supplied from the National Institutes of Health of America (NIH)

Next, "carbon solid solution ratio" of the tools 1 and 2 was obtained. Measuring position of the sample was made similarly to the measuring position of the carbides, that is, at a position ¼ width inward from a surface in a width direction and ½ thickness inward from a surface in a thickness direction. This position was cut, and a fine powder analyzing sample of 0.5 g was taken. The analyzing sample was dissolved in a sulfo-phosphoric acid aqueous solution without heating, and the aqueous solution was filtered with a glass filter having a pore diameter of 0.3 µm. Then, "residue" remaining on the glass filter was analyzed along with the glass filter with a combustion-infrared absorption method, and an amount of carbon in the residue was measured. A mass ratio (by mass %) of the amount of carbon in the residue was subtracted from a mass ratio (by mass %) of a total carbon content of the tool shown in Table 1, in order to obtain a mass ratio (by mass %) of the amount of carbon solid-soluted in the structure. Then, the carbon solid solution ratio was obtained from these values. Table 2 shows the mass ratio (by mass %) of the amount of carbon solid-soluted into the structure of the tools 1 and 2 and the carbon solid solution ratio (%).

Figure 3:
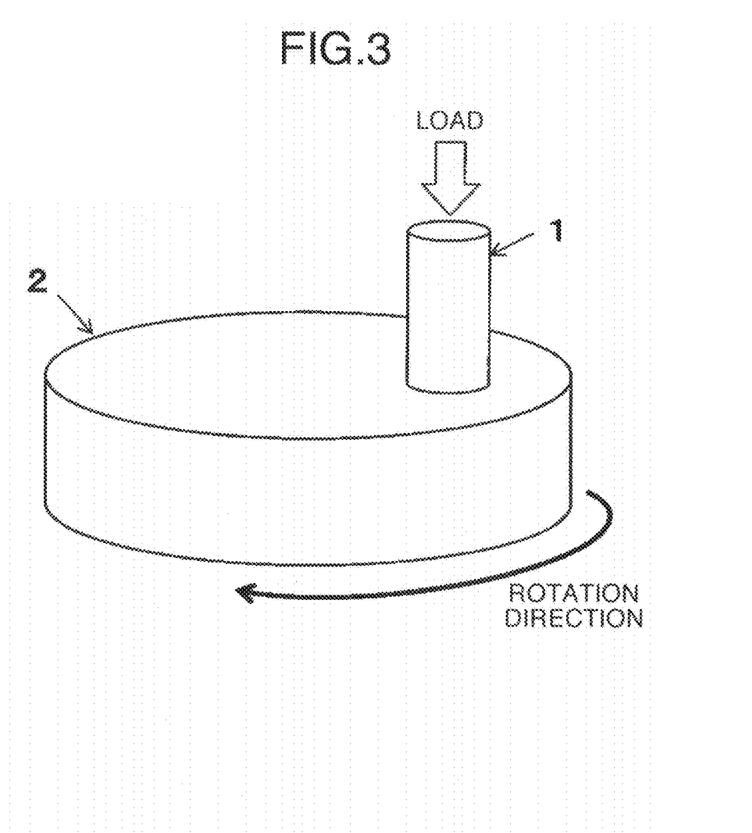
FIG. 3 is a schematic view showing a wear resistance test conducted in the Example.

The wear resistance of the tools 1 and 2 was evaluated. Three pin samples having a diameter of 8 mm and a length of 5 mm were produced from each of the tools 1, 2 and 3, and were subjected to wear resistance test. The test was conducted by pin-on-disk test with a friction and wear tester (EFM-111-1020 made by A&D Company, Ltd.) pursuant to ASTM G99-05. As shown in FIG. 3, while the pin (cold work tool) 1 is pressed against a disk (counterpart material) 2 with a load of 460 N, a disk 2 is rotated at a relative speed of 0.42 m/s. Testing environment was at a room temperature and in a dry atmosphere. The disk 2 was made of an alumina grind stone (alundum abrasive grain #46, and resin binding material).

Figure 4:
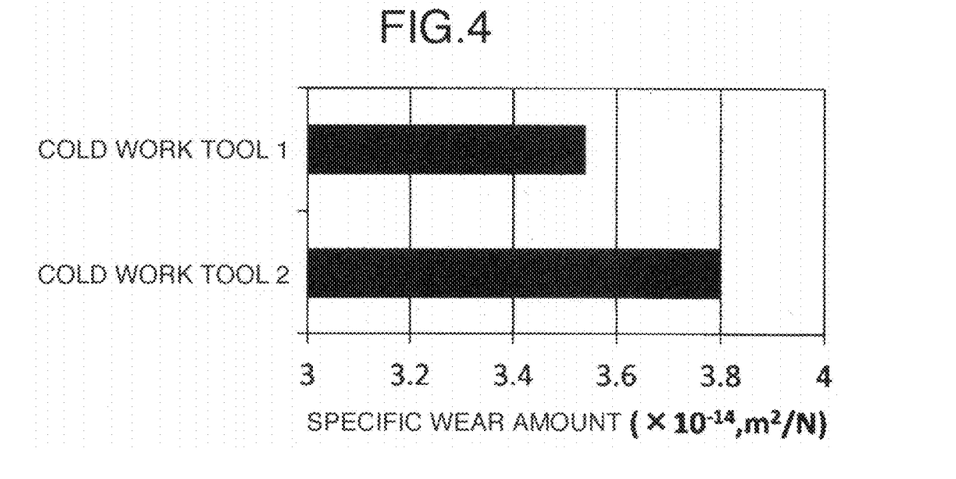
FIG. 4 is a graph showing the wear resistances of an example according to the present invention example and a comparative example.

When the pin 1 slid on a same orbit on the rotating disk 2 and the sliding distance became 377 m, a reduced volume of the pin 1 was measured, and a specific wear amount [=volume reduction/(load*sliding distance)] was obtained. The wear resistance test was conducted by 3 times for each sample and the specific wear amount of each cold work tool was obtained by averaging them. FIG. 4 shows the result.

From FIG. 4, it was known that the cold work tool of the present invention has a smaller specific wear amount and improved wear resistance among the tools having the same hardness.

The tool 1 included a sufficient amount of "carbides having a circle equivalent diameter of not less than 5 µm" in the cross-sectional structure thereof. Furthermore, an amount of carbon solid-soluted in the structure was also much, and the carbon solid solution ratio was increased. Thus, the wear resistance evaluated by the total structure was improved.

The cold work tool 2 also included a sufficient amount of "carbides having a circle equivalent diameter of not less than 5 µm" in the cross-sectional structure thereof. However, the amount of carbon solid-soluted in the structure was small, and the carbon solid solution ratio was low compared with that of the tool 1. Thus, the wear resistance evaluated by the total structure was inferior compared with that of the tool 1.

Example 2

Molten steels (having a melting point of about 1,400° C.) having predetermined compositions were cast to produce raw materials 3 and 4 as shown in Table 3. The materials 3 and 4 are of the cold work tool steel SKD11 which is a standardized steel type of JIS-G-4404. Cu, Al, Ca, Mg, O and N were not added in the materials 3 and 4 (in some cases, Al was added as a deoxidizer in the melting step) and satisfy Cu≤0.25%, Al≤0.25%, Ca≤0.0100%, Mg≤0.0100%, O≤0.0100%, and N≤0.0500%. Before pouring the molten steel into a mold, a temperature of the molten steel was adjusted at 1,500° C. Also, a size of the mold was changed for each material 3 and 4, so that a cooling time passing a

TABLE 2

| Cold work tool | Area ratio of carbides having circle equivalent diameter ≥5 µm (area %) | Total amount of carbon in cold work tool (mass %) | Amount of carbon solid-soluted in structure (mass %) | Carbon solid solution ratio (%) | Remarks |
|---|---|---|---|---|---|
| 1 | 9.3 | 1.48 | 1.27 | 85.8 | Example according to present invention |
| 2 | 5.6 | 1.48 | 1.05 | 70.9 | Comparative example | solid phase-liquid phase coexistence region after the pouring was controlled for 45 minutes for the material 3, and 168 minutes for the material 4.

TABLE 3

| Raw material | C | Si | Mn | P | S | Cr | Mo | V | Fe* | mass % |
|---|---|---|---|---|---|---|---|---|---|---|
| 3 | 1.40 | 0.32 | 0.40 | 0.023 | 0.0010 | 11.7 | 0.82 | 0.23 | Bal. | |
| 4 | 1.42 | 0.30 | 0.40 | 0.023 | 0.0010 | 11.7 | 0.86 | 0.23 | Bal. | |

*including impurities

Next, these raw materials were heated at 1,160° C. and hot-worked. After hot-worked they were natural-cooled, and steels having a thickness of 79 mm, a width of 560 mm and a length of 1,500 mm were obtained. In the cooling after the hot working, the raw material 3 was subjected to sufficient cooling until 170° C. Before reaching 300° C., the raw material 4 was subjected to heating for a subsequent annealing step. The steel materials were annealed at 860° C., and thus cold work tool materials 3 and 4 were produced (having a hardness of about 190 HBW). Furthermore, these cold work tool materials 3 and 4 were quenched and tempered, and cold work tools 3 and 4 having a martensitic structure were produced. The quenching temperature was 1,030° C. and the tempering temperature was selected from a range between 480° C. and 540° C. so as to have a hardness 60 HRC.

Figure 5:
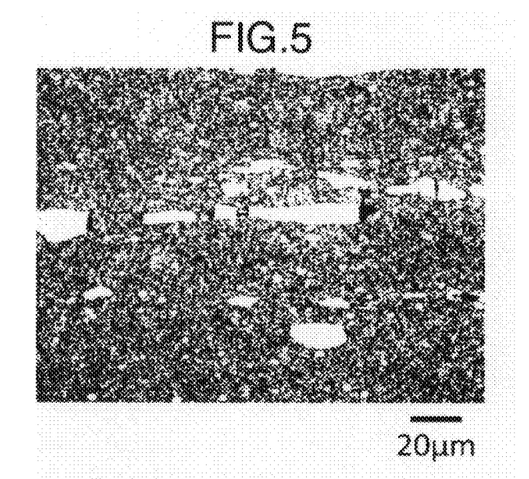
FIG. 5 is an optical microscope photograph of a cross-sectional structure of a cold work tool of an example according to the present invention for showing an example of carbide distribution in the cross-sectional structure.
Figure 6:
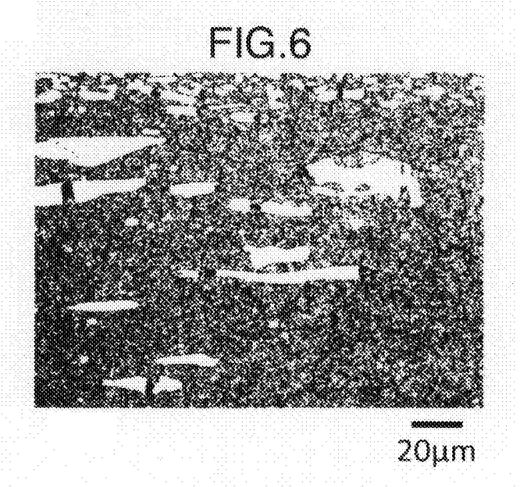
FIG. 6 is an optical microscope photograph of a cross-sectional structure of a cold work tool of a comparative example for showing an example of carbide distribution in the cross-sectional structure.

An area ratio of carbides having a circle equivalent diameter of not less than 5 μm in the cross-sectional structure of the cold work tools 3 and 4 was measured. Measuring method was same as that of Example 1. FIGS. 5 and 6 show examples of quenched and tempered micro-structure of the cold work tools 3 and 4 respectively (carbides are shown by light-colored distribution). Then, these micro-structures were subjected to image processing similar to that of Example 1. The carbides having a circle equivalent diameter of not less than 5 μm were extracted, and an area ratio of the carbides was obtained from an average of 10 fields of view. The result is shown in Table 4.

Next, "carbon solid solution ratio" of the cold work tools 3 and 4 was obtained. Sampling position was similarly to the measuring position of the carbides. Then, the "amount of carbon in a residue" at the position was measured by a method same as that of Example 1, and a mass ratio (by mass %) of the amount of carbon in the residue was subtracted from a mass ratio (by mass %) of a total carbon content of the tool shown in Table 3, in order to obtain a mass ratio (by mass %) of the amount of carbon solid-soluted in the structure. Then, the carbon solid solution ratio was obtained from the values. Table 4 shows the mass ratio (by mass %) of the amount of carbon solid-soluted into the structure of the tools 3 and 4 and the carbon solid solution ratio (%).

Figure 7:
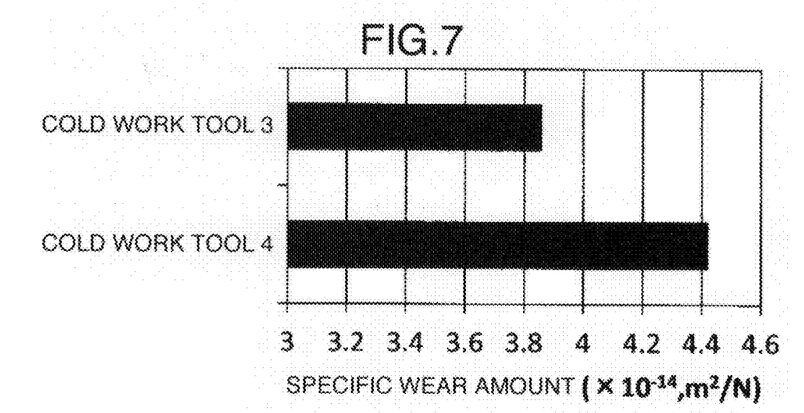
FIG. 7 is a graph showing the wear resistances of an example according to the present invention example and a comparative example.

The wear resistance of the tools 3 and 4 was evaluated. Three pin samples having a diameter of 8 mm and a length of 5 mm were produced from each of the tools 3 and 4, and were subjected to the wear resistance test. The testing method, the manner or the like were similar to those of Example 1 (see FIG. 3). A specific wear amount [=volume reduction/(load*sliding distance)] was obtained. The wear resistance test was conducted by 3 times for each sample and the specific wear amount of each cold work tool was obtained by averaging them. FIG. 7 shows the result.

From FIG. 7, it was known that the cold work tool of the present invention has a smaller specific wear amount and improved wear resistance among the tools having the same hardness.

The cold work tool 3 included a sufficient amount of "carbides having a circle equivalent diameter of not less than 5 μm" in the cross-sectional structure thereof. Furthermore, an amount of carbon solid-soluted in the structure was also much, and the carbon solid solution ratio was increased. Thus, the wear resistance evaluated for the total structure was improved.

The cold work tool 4 also included a sufficient amount of "carbides having a circle equivalent diameter of not less than 5 μm" in the cross-sectional structure thereof. However, the amount of carbon solid-soluted into the structure was small, and the carbon solid solution ratio was low compared with that of the tool 3. Thus, the wear resistance evaluated by the total structure was inferior compared with that of the tool 3.

REFERENCE SIGNS LIST

1 Pin (cold work tool)
2 Disk (counterpart material)

The invention claimed is:
1. A cold work tool having a composition comprising: by mass,
C: 1.30 to 2.40%
Cr: 11.0 to 15.0%
Mo and W alone or in combination in an amount of (Mo+½W): 0.50 to 3.00%
V: 0.10 to 1.50%
Si: not more than 2.00%
Mn: not more than 1.50%
P: not more than 0.050%
S: not more than 0.0500%
optionally Ni: 0 to 1.00%
optionally Nb: 0 to 1.50%, and
the balance of Fe and impurities,
and having a martensitic structure,
wherein the tool has a hardness of not lower than 58 HRC,
wherein an area ratio of carbides having a circle equivalent diameter of not less than 5 μm in a cross-sectional structure of the tool is not lower than 4.0 area %, and
wherein a carbon solid solution ratio is not less than 75.0%, where the carbon solid solution ratio is defined

TABLE 4

| Cold work tool | Area ratio of carbides having circle equivalent diameter ≥5 μm (area %) | Total amount of carbon in cold work tool (mass %) | Amount of carbon solid-soluted in structure (mass %) | Carbon solid solution ratio (%) | Remarks |
|---|---|---|---|---|---|
| 3 | 5.4 | 1.40 | 1.05 | 75.0 | Example according to present invention |
| 4 | 5.6 | 1.42 | 0.85 | 59.9 | Comparative example | as a ratio, by mass, of an amount of carbon solid-soluted in the structure of the tool to a total amount of carbon included in the tool.

2. The cold work tool according to claim 1, wherein the carbon solid solution ratio is not less than 80.0%.

3. The cold work tool according to claim 1, comprising 1.30 to 1.80% of carbon, by mass.

4. A method for manufacturing a cold work tool according to claim 1, comprising:
- a casting step of pouring a molten steel into a mold wherein the steel has the composition and the molten steel has a temperature of 90° C. to 110° C. above a melting point, and cooling the poured molten steel at a cooling rate such that the steel passes a solid-liquid phase coexistence region within 60 minutes to produce a raw material;
- a hot working step of subjecting the raw material to hot working, and cooling the hot-worked raw material to a temperature generating a martensitic transformation to produce a steel including martensitic transformed from a structure of the raw material;
- an annealing step of subjecting the steel to annealing to produce a cold work tool material; and
- a quenching and tempering step of subjecting the cold work tool material to quenching and tempering to produce a cold work tool having a martensitic structure and having a hardness of not lower than 58 HRC.

* * * * *